US010465764B2

(12) United States Patent
Smeljanskij

(10) Patent No.: US 10,465,764 B2
(45) Date of Patent: Nov. 5, 2019

(54) REGULABLE VIBRATION DAMPER

(71) Applicants: THYSSENKRUPP BILSTEIN GMBH, Ennepetal (DE); thyssenkrupp AG, Essen (DE)

(72) Inventor: Dmitrij Smeljanskij, Leverkusen (DE)

(73) Assignees: THYSSENKRUPP BILSTEIN GMBH, Ennepetal (DE); THYSSENKRUPP AG, Essen (DE)

( * ) Notice: Subject to any disclaimer, the term of this patent is extended or adjusted under 35 U.S.C. 154(b) by 0 days.

(21) Appl. No.: 15/551,495

(22) PCT Filed: Feb. 18, 2016

(86) PCT No.: PCT/EP2016/053437
§ 371 (c)(1),
(2) Date: Aug. 16, 2017

(87) PCT Pub. No.: WO2016/131908
PCT Pub. Date: Aug. 25, 2016

(65) Prior Publication Data
US 2018/0038441 A1  Feb. 8, 2018

(30) Foreign Application Priority Data

Feb. 20, 2015 (DE) .................. 10 2015 102 478

(51) Int. Cl.
*F16F 9/46* (2006.01)
*B60G 13/08* (2006.01)
*B60G 17/08* (2006.01)
*F16F 9/348* (2006.01)
*F16F 9/32* (2006.01)
*F16F 9/34* (2006.01)

(52) U.S. Cl.
CPC ............. *F16F 9/465* (2013.01); *B60G 13/08* (2013.01); *B60G 17/08* (2013.01); *F16F 9/3481* (2013.01);
(Continued)

(58) Field of Classification Search
CPC .......... F16F 9/325; F16F 9/3481; F16F 9/465; F16F 9/468; B60G 13/08; B60G 17/08
See application file for complete search history.

(56) References Cited

U.S. PATENT DOCUMENTS 4,953,671 A * 9/1990 Imaizumi ................ F16F 9/464
 188/266.3
4,997,068 A * 3/1991 Ashiba .................... F16F 9/468
 188/266.4
(Continued)

FOREIGN PATENT DOCUMENTS

CN 102138024 A 7/2011
CN 102472352 A 5/2012
(Continued)

OTHER PUBLICATIONS

English Translation of International Search Report issued in PCT/EP2016/053437, dated May 30, 2016 (dated Jun. 9, 2016).
English abstract of DE 102014116264.

*Primary Examiner* — Melody M Burch
(74) *Attorney, Agent, or Firm* — thyssenkrupp North America, Inc.

(57) ABSTRACT

A regulable vibration damper may comprise a cylinder barrel that contains hydraulic fluid in a sealed manner, a piston that can be moved axially within the cylinder barrel along a cylinder barrel axis and that subdivides the cylinder barrel into two working chambers, a piston rod that is oriented parallel to the cylinder barrel axis and is connected to the piston, a valve assembly arranged at a fluid feed through to damp piston movement in an actuating direction, and a bypass duct between the two working chambers. The bypass duct may comprise a first throughflow cross section for a first throughflow direction, wherein the first throughflow cross section differs from a second throughflow cross section for a second throughflow direction. Further, the
(Continued)

bypass duct may be formed, at least in part, by an outflow passage that is arranged on an exit side of a pilot valve for adjusting pilot pressure.

4 Claims, 2 Drawing Sheets

(52) U.S. Cl.
CPC .............. *F16F 9/468* (2013.01); *F16F 9/325* (2013.01); *F16F 9/3405* (2013.01)

(56) References Cited

U.S. PATENT DOCUMENTS

| | | | |
|---|---|---|---|
| 5,497,862 A * | 3/1996 | Hoya | B60G 17/0152 188/266.4 |
| 5,699,885 A | 12/1997 | Foerster | |
| 7,395,907 B2 * | 7/2008 | de Kock | F16F 9/512 137/614.2 |
| 2012/0145496 A1 | 6/2012 | Goeetz | |
| 2013/0234378 A1 * | 9/2013 | Ericksen | F16F 9/3405 267/221 |
| 2015/0247546 A1 * | 9/2015 | Nowaczyk | F16F 9/512 188/313 |

FOREIGN PATENT DOCUMENTS

| | | |
|---|---|---|
| CN | 103511542 A | 1/2014 |
| DE | 4441047 C | 1/1996 |
| DE | 102009038818 A | 3/2011 |
| DE | 102014116264 A | 5/2016 |
| EP | 0616146 A | 9/1994 |
| EP | 0 713 029 A | 5/1996 |
| WO | 2016066314 A | 5/2016 |

\* cited by examiner

REGULABLE VIBRATION DAMPER

CROSS REFERENCE TO RELATED APPLICATIONS

This application is a U.S. National Stage Entry of International Patent Application Serial Number PCT/EP2016/053437, filed Feb. 18, 2016, which claims priority to German Patent Application No. DE 10 2015 102 478.0 filed Feb. 20, 2015, the entire contents of both of which are incorporated herein by reference.

FIELD

The present disclosure generally relates to vibration dampers, including regulable vibration dampers for vehicle chassis.

BACKGROUND

Such a One vibration damper is known from DE 44 41 047 C1. A piston which is guided axially within a cylinder barrel has provided on it pressure-dependent damping valves for exchange of fluid, during the rebound and compression stages, between two working chambers. Pilot control causes a controllable pressure to be built up in pilot-control chambers. The pilot pressure forces the disks of the damping valves into their closed position. Through a duct system, fluid is directed from the working chambers into the pilot-control chambers and therefore the pressure there is increased. The pilot pressure is regulated with the aid of an externally adjustable pilot valve, which is arranged in the duct system. An element separates off the pilot-control chamber and the working chamber. Fluid can flow out from the pilot valve, via outflow passages, into the respectively pressure-free working chamber.

Such a vibration damper is also described in German patent application 10 2014 115 577.7, which has not yet been published.

The valve disks give the vibration damper usually a degressive damping behavior at high piston speeds, at which the valve disks end up being raised off from the valve seat. The opening cross section here increases as speed increases, which triggers the degressive behavior.

Patent application 10 2014 116 264.1, which has not yet been published, describes a development of the aforementioned vibration dampers. Alongside the damping via the valve disks, one or more bypass ducts form, within the piston, a throttle between the working chambers, and said throttle gives a progressive component to the damping behavior of the vibration damper. The influence of this progressive component is important in particular at low piston speeds, at which the valve disks still lie fully against the valve seat. The bypass duct is formed in the piston. The bypass duct here is covered by different sizes of check-valve disks on either side of the piston, and this gives rise to different bypass throughflow cross sections for the two throughflow directions.

It is the object of the present invention to develop Thus a need exists for a cost-effective configuration which that provides an alternative to German patent application 10 2014 116 264.1 and in which use can be made of a standard piston, although it is nevertheless possible to realize different bypass throughflow cross sections for the two throughflow directions. The solution should be capable of being implemented in a cost effective manner.

DETAILED DESCRIPTION

Figure 1:
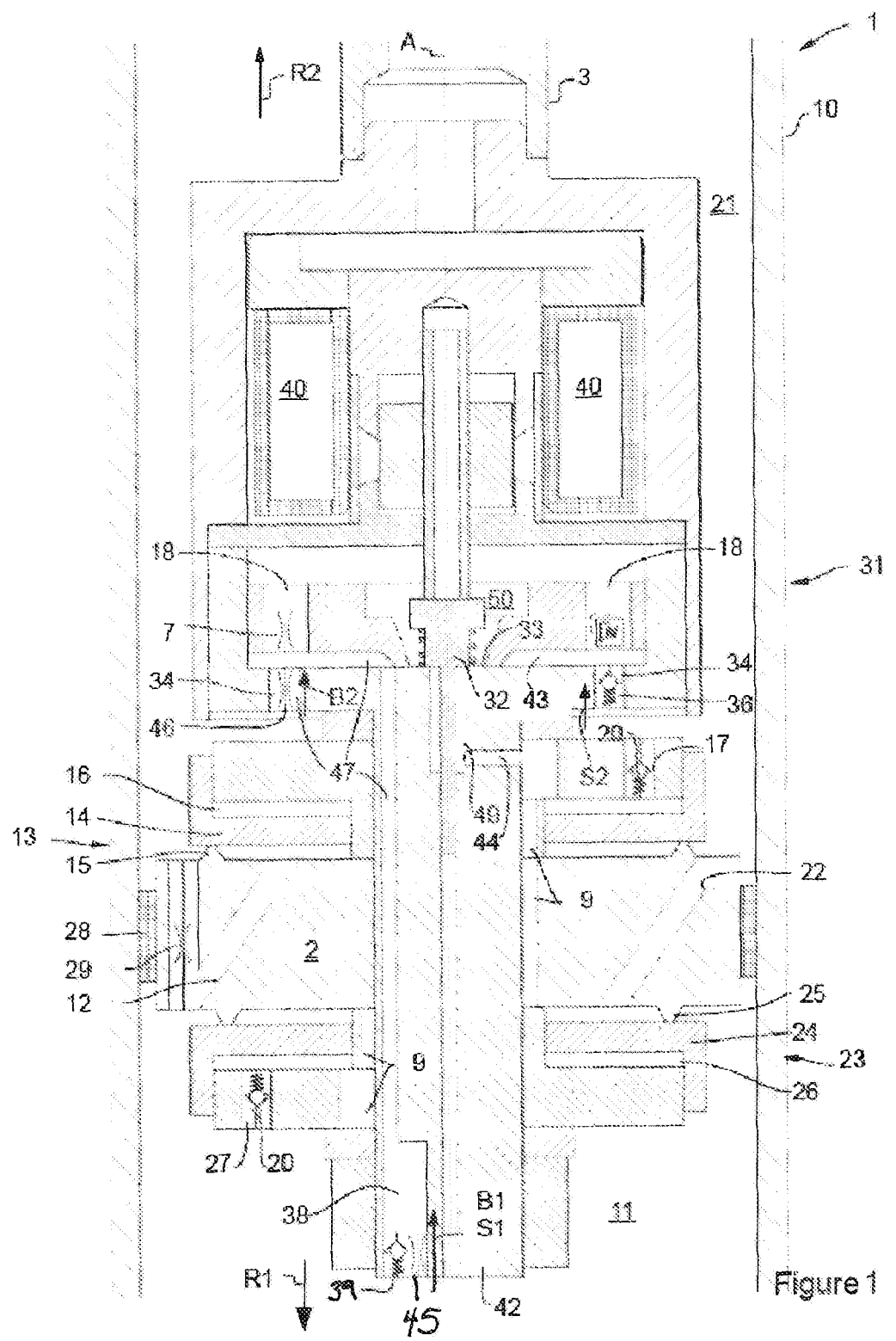
FIG. 1 is a cross sectional view of an example vibration damper.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

One example object of the present disclosure is achieved by a regulable vibration damper, in particular for a vehicle chassis, comprising a cylinder barrel, with a hydraulic fluid accommodated in a sealed manner therein, also comprising a piston, which can be moved axially, within the cylinder barrel, along a cylinder-barrel axis and subdivides the cylinder barrel into two working chambers, and further comprising a piston rod, which is oriented parallel to the cylinder-barrel axis and is connected to the piston. In particular, the piston comprises at least two fluid feed-throughs, by way of which the one working chamber is connected to the other working chamber. At least one first valve assembly is arranged in order to damp the piston movement in an actuating direction. For each actuating direction, it is possible for a separate valve assembly to be provided at an appropriate fluid feed-through in order to damp the piston movement of the corresponding actuating direction. In particular, each valve assembly comprises at least one valve disk which, in a closed valve position, is seated on a valve seat, and thus at least partially covers the associated fluid feed-through, and which, in an open valve position, is at least partially spaced apart from the valve seat. At least one bypass duct is provided, in addition to the fluid feed-throughs, between the two working chambers, and comprises a first throughflow cross section for a first throughflow direction, said first throughflow cross section differing from a second throughflow cross section for a second throughflow direction.

According to the invention, then, the bypass duct, which connects in particular the working chambers to one another while bypassing the two valve assemblies, is formed, at least in part, by at least one outflow passage, in particular two outflow passages, arranged on the exit side of a pilot valve. The pilot valve serves for adjusting a pilot pressure, by means of which it is possible to prestress in particular valve disks. The outflow passage serves for the hydraulic fluid which is throttled in the pilot valve to flow out into that working chamber which is currently free of pressure. Since there is a periodic change in which of the two working chambers is free of pressure, the pilot valve has to be connected, on the exit side, to the two working chambers.

There is therefore a connection between the two working chambers, and this is used, then, according to the invention for the bypass-volume flow.

Provision is preferably made, in at least one outflow passage, in particular at the mouth opening of the latter into one of the working chambers, for a valve arrangement which comprises an outflow-passage bypass throttle and a one-way valve connected in parallel therewith, wherein the blocking direction of the one-way valve is oriented into the bypass duct from that working chamber into which the outflow passage opens out. The outflow-passage bypass throttle here defines a bypass cross section of the bypass duct. The parallel-connection one-way valve imparts to the outflow-passage bypass throttle, then, a direction of action which is in the same direction as the blocking direction of said valve. This is because it is only in the direction in which the parallel one-way valve is closed that the outflow-passage bypass throttle can define the smallest bypass cross section. If hydraulic fluid flows in the other direction (counter to the blocking direction), the one-way valve is open and thus bridges the outflow-passage bypass throttle. By virtue of this parallel connection, the action of the outflow-passage bypass throttle is thus rendered dependent either on the compression stage or on the rebound stage.

In particular, provision is made, in at least one first outflow passage, which connects the pilot valve to the first working chamber, for a first valve arrangement, which comprises a first outflow-passage bypass throttle and a one-way valve connected in parallel therewith, wherein the blocking direction of the one-way valve is oriented into the bypass duct from the first working chamber.

As an alternative, or in combination therewith, provision is made, in a second outflow passage, which connects the pilot valve to the second working chamber, for a second valve arrangement, which comprises a second outflow-passage bypass throttle and a one-way valve connected in parallel therewith, wherein the blocking direction of the one-way valve is oriented into the bypass duct from the second working chamber.

In particular, the invention can be used for a regulable vibration damper in which each valve assembly comprises at least one valve disk which, in a closed valve position, is seated on a valve seat, and thus at least partially covers the associated fluid feed-through, and which, in an open valve position, is at least partially spaced apart from the valve seat, and wherein each valve assembly comprises a pilot-control chamber, wherein the valve disk can be prestressed into the closed valve position by virtue of the pilot-control chamber being subjected to pressure, wherein the pressure in the respective pilot-control chambers can be adjusted by the pilot valve.

This arrangement according to the invention in respect of the outflow-passage bypass throttle makes it possible to realize different bypass cross sections without there being any need for a particular configuration of the valve disks, valve seat or piston. It is thus possible, by virtue of the different throughflow cross sections of the bypass ducts, to provide for separate adjustment of the damping behavior of the vibration damper, in particular for low piston speeds, for the two throughflow directions. A straightforward outflow-passage bypass throttle can be realized in a cost-effective manner by a defined bore for example in the fastening pin. The one-way valves are present in any case in the outflow passages of the known vibration dampers and therefore do not give rise to any additional costs.

The vibration damper 1 according to FIG. 1 comprises a cylinder barrel 10, in which a piston 2 is retained such that it can be displaced along a cylinder-barrel axis A. The piston 2 comprises an annular seal or a piston band 28 on its outer circumference, and therefore the piston 2 subdivides the cylinder barrel 10 in a sealing manner into a first working chamber 11 (which is remote from the piston rod) and into a second working chamber 21 (which is in the vicinity of the piston rod). The piston 2 is fastened on a fastening pin 42 which, for its part, is fixed to a piston rod 3. Upon actuation of the piston rod 3 in a first actuating direction R1, toward the first working chamber 11 (also referred to as "compression direction"), the pressure in the first working chamber 11 increases. Fluid which is present in the first working chamber 11 then flows through a first fluid feed-through 12 in the piston 2 into the second working chamber 21. The fluid here flows through the first fluid feed-through 12 and through a first valve assembly 13 having a pressure-relief valve 14. The pressure-relief valve 14 may be formed, for example, from one or more flexible valve disks 14. When a minimum fluid pressure is reached in the first working chamber 11, the first pressure-relief valve 14, which is seated with prestressing on a first valve seat 15, is at least partially released from the first valve seat 15. The valve disk 14 is thus transferred from the closed position into the open position, in which it is raised off from the valve seat. A hydraulic connection is thus established between the first working chamber 11 and the second working chamber 21. The first pressure-relief valve 14 in conjunction with the first valve seat 15 generates the damping force here.

The pressure-relief valve 14 is forced in the direction of the valve seat 15 by a pressure (hereinbelow "pilot pressure") which prevails in a first pilot-control chamber 16. This pilot pressure in the first pilot-control chamber 16 can be adjusted in a defined manner during operation. It is clear that the opening pressure of the pressure-relief valve 14 becomes higher as the pilot pressure in the first pilot-control chamber 16 becomes higher. The pilot pressure thus influences the characteristic curve of the damping force in the PV diagram.

The vibration damper 1 also comprises a second valve assembly 23, which is configured in a manner analogous to the first valve assembly 13. The second valve assembly 23 is provided in order to brake the fluid flow when the piston 2 is moved in a second actuating direction R2 (also referred to as "rebound direction"). In this case, the fluid flows from the second working chamber 21, via a second fluid feed-through 22, into the first working chamber 11. A second valve disk 24 is forced in the direction of a valve seat 25 by a pilot pressure which prevails in a second pilot-control chamber 26. The second valve disk 24 and a second valve seat 25 are designed in a manner analogous to the corresponding components of the first valve assembly 13.

A plurality of bypass feed-throughs 29 are optionally provided in the piston 2 in order to realize a bypass-volume flow which is equally effective for both the compression and rebound stages and connects the two working chambers 11, 21 to one another while bypassing the valve disks 14, 24.

The two pilot-control chambers 16, 26 are connected to one another hydraulically via a connecting feed-through 9. The connecting feed-through 9 is connected to an annular chamber 49 via a radial bore 44. The annular chamber 49 opens out into a pilot-valve chamber 50 of a pilot valve 31, which will be explained in more detail hereinbelow. The hydraulic connection by means of the connecting feed-through 9 results in always the same pressure essentially prevailing in the two pilot-control chambers 16, 26. If the piston 2 is then moved in the first actuating direction R1, then the pressure in the first working chamber 11 increases and the damping fluid flows into the second pilot-control chamber 26 from the first working chamber 11, through a fluid feed-through 27 between the first working chamber 11 and the second pilot-control chamber 26, as a result of which the pilot pressure in the second pilot-control chamber 26 is increased. Through the connecting feed-through 9, the pilot pressure which is built up in the second pilot-control chamber 26 also propagates into the first pilot-control chamber 16. This results in the pilot pressure which influences the damping behavior of the first valve assembly 13 being generated in the first pilot-control chamber 16. The same applies to the actuation in the second actuating direction R2. In this case, the fluid flows into the first pilot-control chamber 16 from the second working chamber 21, through a fluid feed-through 17 between the second working chamber 21 and the first pilot-control chamber 16. The pilot pressure which is thus generated in the first pilot-control chamber 16 propagates, in turn, into the second pilot-control chamber 26 through the connecting feed-through 9. So that it is not possible for the fluid to flow, through the fluid feed-throughs 17, 27, from the first pilot-control chamber 16 directly into the second working chamber 21 or from the second pilot-control chamber 26 into the first working chamber 11, a respective one-way valve 20, designed for example in the form of a check valve, is fitted in the fluid feed-throughs 17, 27.

The pilot pressure in the two pilot-control chambers 16 and 26 can be regulated. The already mentioned pilot valve 31, which comprises a valve body 32, is provided for this purpose. The valve body 32 is retained in a movable manner along the cylinder-barrel axis A and can be seated on a fixed (as seen in relation to the fastening pin) valve seat 33. When the valve body 32 is seated on the valve seat 33, fluid which flows from the pilot-control chambers 16, 26, through the annular chamber 49, into the pilot-valve chamber 50 is largely prevented from flowing off by way of the pilot valve 31. If the valve body 32 is released from the valve seat 33, then fluid can flow off from the connecting feed-through 9 and the annular chamber 49 by way of the pilot valve 31. The positioning of the valve body 32 can help to adjust the pilot pressure. The valve body 32 here is forced onto the valve seat 33, that is to say in the first actuating direction R1, by means of a magnetic actuator 40. The valve body 32 is forced away from the valve seat 33 by the pilot pressure. The positioning of the valve body 32 in relation to the valve seat 33 is achieved, then, in dependence on the force conditions inducted by the magnetic actuator 40 and the pilot pressure.

Upon actuation of the piston rod in the direction R1 (increased pressure in the first working chamber 11), the fluid which flows off by way of the pilot valve 31 flows into the second working chamber 21 through a second outflow passage 34. A one-way valve 36 is arranged in the second outflow passage 34.

Upon actuation of the piston rod 3 in the direction R2 (increased pressure in the second working chamber 21), the fluid which flows off by way of the pilot valve 31 flows to the first working chamber 11 through a first outflow passage 38. A one-way valve 39 is arranged in the first outflow passage 38. The first outflow passage 38 is formed by an axial bore in the fastening pin 42.

An exit path 18 is provided for the outflow of the fluid flowing past between the valve body 32 and the valve seat 33. An exit valve 7 is provided at the end of said exit path 18 and can be used to adjust the pressure conditions in the exit path 18. In addition to, or instead of, the throttle shown in the left-hand half of the picture, such an exit valve 7 may comprise a (possibly parallel-connection) pressure-relief valve, which is shown by way of example in the right-hand half of the picture (without any reference sign).

The exit path 18 opens out first of all into an exit chamber 43. The fluid which flows off during the compression stage flows from there into the second outflow passage 34, through the check valve 36 (directed towards the working chamber 21, which is in the vicinity of the piston rod) and into the second working chamber 21, which is in the vicinity of the piston rod. The fluid which flows off during rebound flows from the exit duct 43 into the first outflow passage 38, through the check valve 39 (directed toward the working chamber 11, which is remote from the piston rod) and into the first working chamber 11, which is remote from the piston rod. As illustrated with reference to the second outflow passage 34, such an outflow passage may be formed by one or more bores.

For the stage-specific adjustment of the bypass cross section, a first outflow-passage bypass throttle 45 is arranged in the first outflow path 38, in parallel connection with the check valve 39. It would, indeed, be possible for fluid to flow basically in both directions through said first outflow-passage bypass throttle 45; since the parallel check valve 39 opens during the rebound stage, there is no throttle action during this stage. Said first outflow-passage bypass throttle 45 thus performs a bypass action only during the compression stage.

For stage-specific adjustment of the bypass cross section, it is also the case that a second outflow-passage bypass throttle 46 is arranged in the second outflow path 34, in parallel connection with the check valve 36. It would, indeed, be possible for fluid to flow basically in both directions through said second outflow-passage bypass throttle 46; since the parallel check valve 36 opens during the compression stage, there is no throttle action during this stage. Said second outflow-passage bypass throttle 46 thus performs a bypass action only during the rebound stage.

The first outflow passage 38, the exit chamber 43 and the second outflow passage 34 thus form a bypass duct 47 (common to both stages) between the first working chamber 11 and the second working chamber 21. The arrangement made up of parallel-connection one-way valve 39 and 36 and outflow-passage bypass throttle 45 and 46 is provided in each case at the mouth opening of said bypass duct 47 at the first working chamber 11 and at the second working chamber 21, respectively.

Figure 2:
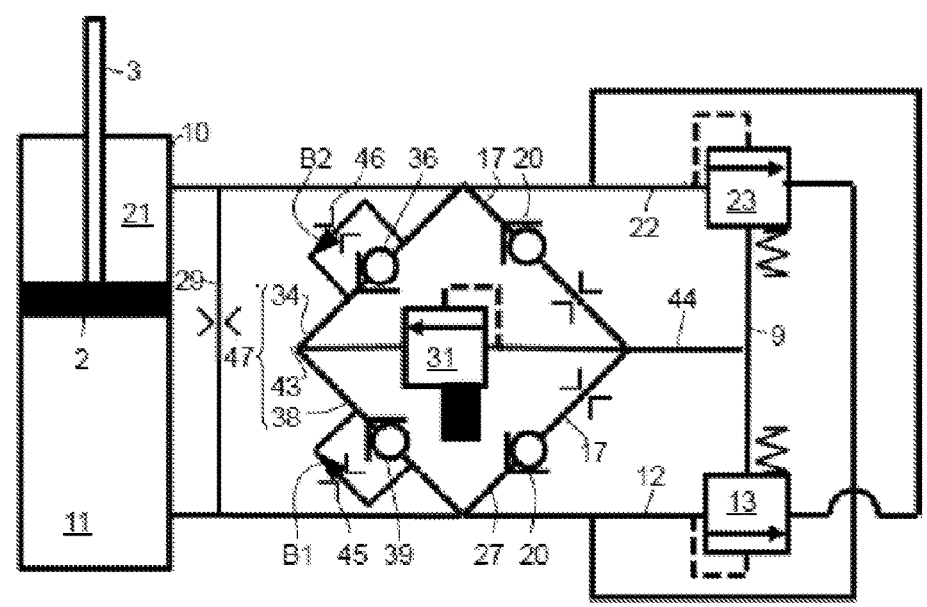
FIG. 2 is a hydraulic circuit diagram of the vibration damper of FIG. 1.

FIG. 2 shows, schematically, a hydraulic circuit diagram of the vibration damper. The functioning is explained with reference to examples of free throughflow cross sections of the respective valves, these being indicated between parentheses hereinbelow.

The bypass duct 47, which is formed by the two outflow passages 34, 38 and the outflow chamber 43, is evident. The bypass duct 47 is separated off from the working chamber 11, which is remote from the piston rod, by the one-way valve 39 and the first outflow-passage bypass throttle 45 (free throughflow-cross-section value "1"). The bypass duct 47 is separated off from the working chamber 21, which is in the vicinity of the piston rod, by the one-way valve 36 and the second outflow-passage bypass throttle 46 (free throughflow-cross-section value "2").

During the compression stage, the one-way valve 39 is closed. Fluid flows from the working chamber 11, which is remote from the piston rod, through the first outflow-passage bypass throttle 45 and into the bypass duct 47, and thereafter through the then open one-way valve 36 into the working chamber 21, which is in the vicinity of the piston rod (throughflow direction B1). The free bypass cross section in the bypass duct is defined by the smallest opening; during the compression stage, this forms the first outflow-passage bypass throttle 45 with value "1".

During the rebound stage, the one-way valve 36 is closed. Fluid flows from the working chamber 21, which is in the vicinity of the piston rod, through the second outflow-passage bypass throttle 46 and into the bypass duct 47, and thereafter through the then open one-way valve 39 into the working chamber 11, which is remote from the piston rod (throughflow direction B2). The free bypass cross section in the bypass duct is defined by the smallest opening; during the rebound stage, this forms the second outflow-passage bypass throttle 46 with value "2".

The first outflow-passage bypass throttle 45 with the relatively small throughflow cross section, although also open during the rebound stage, can nevertheless be disregarded during said rebound stage, since the one-way valve 39 of considerably larger cross section (e.g. free throughflow-cross-section value "10") is open parallel thereto. This gives, in total, a free throughflow cross section with value "12".

The two outflow-passage bypass throttles 45, 46 can be made by small bores of defined diameter in the appropriate components, and therefore the vibration damper according to the invention is barely any more expensive to produce than the vibration damper described in German patent application 10 2014 115 577.7.

For the stage-specific bypass adjustment, it is sufficient if just one of the aforementioned outflow-passage bypass throttles 45, 46 is provided. A bypass cross section which is equally effective for both stages is formed, in addition, by the above-described bypass feed-throughs 29 in the piston 2, throttles which are effective for both stages being arranged in said bypass feed-throughs.

LIST OF REFERENCE SIGNS

1 Vibration damper
2 Piston
3 Piston rod
6 Dimensionally stable movable cover
7 Exit valve
8 Failsafe valve
9 Connecting feed-through between the two pilot-control chambers
10 Cylinder barrel
11 First working chamber (which is remote from the piston rod)
12 First fluid feed-through
13 First valve assembly
14 First valve disk
15 First valve seat
16 First pilot-control chamber
17 Fluid feed-through between the second working chamber 21 and first pilot-control chamber 16
18 Exit path
20 One-way valve
21 Second working chamber (which is in the vicinity of the piston rod)
22 Second fluid feed-through
23 Second valve assembly
24 Second valve disk
25 Second valve seat
26 Second pilot-control chamber
27 Fluid feed-through between the first working chamber 11 and second pilot-control chamber 26
28 Annular seal
29 Bypass feed-through
31 Pilot valve
32 Valve body
33 Valve seat
34 Second outflow passage to the second working chamber
35 Pin/turquoise for reallocation of reference sign
36 One-way valve
38 First outflow passage to the first working chamber
39 One-way valve
40 Magnetic actuator
42 Fastening pin
43 Exit chamber
44 Radial bore
45 First outflow-passage bypass throttle
46 Second outflow-passage bypass throttle
47 Bypass duct
49 Annular chamber
R1 Compression direction
R2 Rebound direction
A Cylinder-barrel axis
R Actuating direction
p Build-up pressure
S1, S2 Blocking direction

What is claimed is:

1. A regulable vibration damper comprising:
a cylinder barrel that contains hydraulic fluid in a sealed manner;
a piston that is movable axially within the cylinder barrel along a cylinder-barrel axis and that subdivides the cylinder barrel into two working chambers;
a piston rod that is oriented parallel to the cylinder-barrel axis and that is connected to the piston;
a valve assembly disposed at a fluid feed-through of the piston to damp piston movement in an actuating direction; and
a bypass duct disposed between the two working chambers, the bypass duct comprising a first throughflow cross section for a first throughflow direction, wherein the first throughflow cross section differs from a second throughflow cross section for a second throughflow direction, wherein the bypass duct comprises an outflow passage that is disposed on an exit side of a pilot valve for adjusting a pilot pressure,
wherein the outflow passage is a first outflow passage that connects the pilot valve to a first working chamber of the two working chambers, the regulable vibration damper further comprising a first valve arrangement that includes a first outflow-passage bypass throttle and a first one-way valve connected in parallel with the first outflow-passage bypass throttle, wherein a blocking direction of the first one-way valve is oriented into the bypass duct from the first working chamber, and
further comprising a second valve arrangement disposed in a second outflow passage that connects the pilot valve to a second working chamber of the two working chambers, the second valve arrangement comprising a second out-flow passage bypass throttle and a second one-way valve connected in parallel with the second out-flow passage bypass throttle, wherein a blocking direction of the second one-way valve is oriented into the bypass duct from the second working chamber.

2. The regulable vibration damper of claim 1 wherein the valve assembly comprises a valve disk, wherein in a closed valve position the valve disk is seated on a valve seat and at least partially covers the fluid feed-through, wherein in an open valve position the valve disk is at least partially spaced apart from the valve seat, wherein the valve assembly further comprises a pilot-control chamber, wherein the valve disk is prestressed into the closed valve position by virtue of the pilot-control chamber being subjected to the pilot pressure that is adjustable by the pilot valve.

3. A regulable vibration damper comprising:
a cylinder barrel that contains hydraulic fluid in a sealed manner;
a piston that is movable axially within the cylinder barrel along a cylinder-barrel axis and that subdivides the cylinder barrel into two working chambers;
a piston rod that is oriented parallel to the cylinder-barrel axis and that is connected to the piston;
a first valve assembly disposed at a first fluid feed-through of the piston to damp piston movement in a first actuating direction;
a second valve assembly disposed at a second fluid feed-through of the piston to damp piston movement in a second actuating direction; and
a bypass duct disposed between the two working chambers, the bypass duct comprising a first throughflow cross section for a first throughflow direction, wherein the first throughflow cross section differs from a second throughflow cross section for a second throughflow direction, wherein the bypass duct comprises a first outflow passage and a second outflow passage disposed on an exit side of a pilot valve for adjusting a pilot pressure,
further comprising:
a first valve arrangement disposed in the first outflow passage, which connects the pilot valve to the first working chamber, wherein the first valve arrangement comprises a first outflow-passage bypass throttle and a first one-way valve connected in parallel with the first outflow-passage bypass throttle, wherein a blocking direction of the first one-way valve is oriented into the bypass duct from the first working chamber, and
a second valve arrangement disposed in the second outflow passage, which connects the pilot valve to the second working chamber, wherein the second valve arrangement comprises a second outflow-passage bypass throttle and a second one-way valve connected in parallel with the second outflow-passage bypass throttle, wherein a blocking direction of the second one-way valve is oriented into the bypass duct from the second working chamber.

4. The regulable vibration damper of claim 3 wherein each of the first and second valve assemblies comprise a valve disk, wherein in a closed valve position the respective valve disk is seated on a valve seat and at least partially covers the respective fluid feed-through, wherein in an open valve position the respective valve disk is at least partially spaced apart from the valve seat, wherein each of the first and second valve assemblies further comprises a pilot-control chamber, wherein the valve disk is prestressed into the closed valve position by virtue of the respective pilot-control chamber being subjected to the pilot pressure that is adjustable by the pilot valve.

* * * * *